(12) United States Patent
Champagne et al.

(10) Patent No.: US 11,203,652 B2
(45) Date of Patent: Dec. 21, 2021

(54) METHOD FOR PREPARING A POLYMER

(71) Applicant: COATEX, Genay (FR)

(72) Inventors: Clementine Champagne, Caluire-et-Cuire (FR); Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 203 days.

(21) Appl. No.: 16/323,097

(22) PCT Filed: Sep. 14, 2017

(86) PCT No.: PCT/FR2017/052449
§ 371 (c)(1),
(2) Date: Feb. 4, 2019

(87) PCT Pub. No.: WO2018/060563
PCT Pub. Date: Apr. 5, 2018

(65) Prior Publication Data
US 2019/0185595 A1    Jun. 20, 2019

(30) Foreign Application Priority Data
Sep. 29, 2016 (FR) ..................... 16 59287

(51) Int. Cl.
| | | |
|---|---|---|
| *C08F 20/06* | (2006.01) |
| *C08F 2/10* | (2006.01) |
| *C08F 4/10* | (2006.01) |
| *C08F 4/34* | (2006.01) |
| *C08F 4/30* | (2006.01) |
| *C08F 220/06* | (2006.01) |
| *C08F 120/06* | (2006.01) |
| *C08F 4/40* | (2006.01) |
| *C08F 8/44* | (2006.01) |

(52) U.S. Cl.
CPC ................ *C08F 20/06* (2013.01); *C08F 2/10* (2013.01); *C08F 4/10* (2013.01); *C08F 4/30* (2013.01); *C08F 4/34* (2013.01); *C08F 4/40* (2013.01); *C08F 8/44* (2013.01); *C08F 120/06* (2013.01); *C08F 220/06* (2013.01)

(58) Field of Classification Search
None
See application file for complete search history.

(56) References Cited

FOREIGN PATENT DOCUMENTS

| | | |
|---|---|---|
| JP | 7-138304 A | 5/1995 |
| JP | 07138304 A * | 5/1995 |
| WO | WO 2016/066916 A1 | 5/2016 |

OTHER PUBLICATIONS

International Search Report dated Nov. 10, 2017 in PCT/FR2017/052449 filed on Sep. 14, 2017.

* cited by examiner

*Primary Examiner* — Richard A Huhn
(74) *Attorney, Agent, or Firm* — Oblon, McClelland, Maier & Neustadt, L.L.P.

(57) ABSTRACT

The invention relates to the preparation of a water-soluble anionic polymer, the weight-average molecular mass $M_W$ of which ranges from 1,000 to 10,000 g/mol and the polydispersity index $I_p$ of which is less than 3.5. The polymer according to the invention is obtained by a polymerization reaction in water of an unsaturated anionic monomer, in the presence of $Cu^I$ or of $Cu^{II}$ and of an aromatic compound comprising a functional group chosen from hydroxyl, primary amine, secondary amine and tertiary amine directly bonded to the aromatic ring. The invention also relates to an aqueous composition comprising the polymer according to the invention.

15 Claims, No Drawings

METHOD FOR PREPARING A POLYMER

The invention relates to the preparation of a water-soluble polymer, the weight-average molecular mass $M_W$ of which ranges from 1,000 to 10,000 g/mol and the polydispersity index $I_p$ of which is less than 3.5. The polymer according to the invention is obtained by a polymerization reaction in water of an unsaturated anionic monomer, in the presence of $Cu^I$ or of $Cu^{II}$ and of an aromatic compound comprising a functional group chosen from hydroxyl, primary amine, secondary amine and tertiary amine directly bonded to the aromatic ring.

The invention also relates to an aqueous composition comprising the polymer according to the invention.

Numerous processes for the preparation of polymers from monomers, in particular from anionic polymers, are known. Generally, during the preparation of these polymers, it is necessary to seek to control the weight-average molecular mass $M_W$ of the polymer prepared. In particular, it is important to be able to obtain polymers, the weight-average molecular mass of which is relatively low. Likewise, it is necessary to control the polydispersity index $I_p$ of the polymers prepared. In particular, this index has to be low. During the polymerization reactions involved, it is important to be able to eliminate or to be able to greatly restrict the use of chain-transfer agent.

During the preparation of such polymers from monomers comprising at least one polymerizable olefinic unsaturation, it is important for the polymers obtained to comprise low contents of salts, in particular of sulfates or of phosphorus salts, indeed even for these polymers to be significantly devoid of such salts.

The absence of residual organic solvent within these polymers is also important.

The limitation or the elimination of the presence of carbon disulfide or hydrogen sulfide within the polymers prepared is also an important characteristic of these preparation processes.

WO 2016 066916 and JP H07 138304 relate to the preparation of acrylic polymers but do not in any way mention the advantageous presence during this preparation of a specific aromatic compound.

The process for the preparation of the polymer according to the invention makes it possible to provide a solution to all or some of the problems of the processes of the state of the art.

Thus, the invention provides a process for the preparation of a water-soluble polymer, the weight-average molecular mass $M_W$ of which ranges from 1,000 to 10,000 g/mol and the polydispersity index $I_p$ of which is less than 3.5, by polymerization reaction in water, at a temperature of greater than 60° C., of at least one main monomer comprising at least one polymerizable olefinic unsaturation, in the presence:
- of at least one metal derivative which is complexed, bonded to at least one ligand or in the ionic form and comprising:
  - at least one element (M) chosen from $Cu^I$ and $Cu^{II}$; or
  - at least one precursor compound of an element (M);
- of at least one aromatic compound (A) comprising at least one functional group (F) chosen from hydroxyl, primary amine, secondary amine and tertiary amine directly bonded to the aromatic ring, in an amount equivalent to at least 300 molar ppm of functional group (F) with respect to the molar amount of main monomer; and
- of at least one initiator compound chosen from hydrogen peroxide, sodium persulfate, potassium persulfate, ammonium persulfate, alkyl hydroperoxide and their mixtures.

Preferably, the polymer prepared according to the invention has a weight-average molecular mass $M_W$ of less than 9,000 g/mol. More preferably, the weight-average molecular mass $M_W$ of the polymer prepared is less than 7,000 g/mol or less than 6,000 g/mol.

Also preferably, the polymer prepared according to the invention has a weight-average molecular mass $M_W$ of greater than 1,200 g/mol. More preferably, the weight-average molecular mass $M_W$ of the polymer prepared is greater than 1,500 g/mol.

Thus, the weight-average molecular mass $M_W$ of the polymer can be between 1,000 and 9,000 g/mol or between 1,000 and 8,000 g/mol or else between 1,000 and 6,000 g/mol. Preferably, the weight-average molecular mass $M_W$ of the polymer can be between 1,200 and 9,000 g/mol or between 1,200 and 8,000 g/mol or else between 1,200 and 6,000 g/mol. Also preferably, the weight-average molecular mass $M_W$ of the polymer can be between 1,500 and 9,000 g/mol or between 1,500 and 8,000 g/mol or else between 1,500 and 6,000 g/mol.

The polydispersity index $I_p$ of the polymer prepared according to the invention is less than 3.5. Preferably, the polydispersity index $I_p$ is less than 3. According to the invention, this polydispersity index $I_p$ can be between 2 and 3.5 or between 2 and 3 or else between 2.2 and 3. It can also be between 2.4 and 3, between 2.6 and 3 or alternatively between 2.2 and 2.8 or between 2.2 and 2.6.

The process according to the invention is carried out in an aqueous medium. Preferably, it can be carried out in the absence of organic solvent. Advantageously, the process according to the invention can be carried out in raw water or in deionized water. It can also be carried out in water from the distribution network or else in water which has not been softened or purified. It can also be carried out in industrial water.

Also advantageously, the process according to the invention can be carried out in the absence of a chain-transfer agent.

Particularly advantageously, during the implementation of the process according to the invention, the reaction medium does not comprise or comprises little in the way of salts.

In particular, the reaction medium comprises little in the way of salts chosen from sulfates, sulfites, phosphates, phosphites or hypophosphites. These salts might result in a detrimental change in the polymer prepared according to the invention. Preferably, the reaction medium comprises a mass amount of sulfates, of sulfites, of phosphates, of phosphites or of hypophosphites which is less than 6,000 ppm, preferably less than 5,000 ppm or than 4,000 ppm, indeed even less than 1,000 ppm, with respect to the amount by weight of main monomer.

The process according to the invention comprises the use of at least one metal derivative comprising an element (M) or else a precursor of such an element (M). The metal derivative can be in different forms. This is because, within the metal derivative, the element (M) can be complexed or bonded to at least one ligand or else be in ionic form. Preferably, the element (M) is in ionic form.

Preference is given, as metal derivative according to the invention, to a compound chosen from copper carbonate, copper carbonate hydrate, copper carbonate hemihydrate, copper acetate, copper sulfate, copper sulfate pentahydrate, copper hydroxide or copper halide.

Besides the element (M) or a precursor of an element (M) present within the metal derivative, the process according to the invention can also employ at least one other element, preferably at least one element chosen from $Fe^{II}$, $Fe^{III}$, $Co^{II}$, $Mn^{II}$ or $Ni^{II}$, $Fe^{II}$ and $Fe^{III}$ are the preferred additional elements. They can be employed in the form of at least one compound chosen from iron sulfate, iron sulfate hydrate, iron sulfate hemihydrate, iron sulfate heptahydrate, iron carbonate, iron carbonate hydrate, iron carbonate hemihydrate or iron chloride. The choice may be made, as other compounds of use for the implementation of the additional elements, of manganese acetate tetrahydrate and cobalt sulfate heptahydrate.

According to the invention, the element (M) can also be combined with at least one precursor compound of an element chosen from $Fe^{II}$, $Fe^{III}$, $Co^{II}$, $Mn^{II}$ or $Ni^{II}$. Two elements (M) can also be combined with at least one precursor compound of an element chosen from $Fe^{II}$, $Fe^{III}$, $Co^{II}$, $Mn^{II}$ or $Ni^{II}$. Mention may be made, as precursor compounds of the elements chosen from $Fe^{II}$, $Fe^{III}$, $Co^{II}$, $Mn^{II}$ or $Ni^{II}$, of iron sulfate, iron sulfate hydrate, iron sulfate hemihydrate, iron sulfate heptahydrate, iron carbonate, iron carbonate hydrate, iron carbonate hemihydrate, iron chloride, manganese acetate tetrahydrate and cobalt sulfate heptahydrate.

The process according to the invention can also employ a precursor compound of an element (M) combined with at least one element chosen from $Fe^{II}$, $Fe^{III}$, $Co^{II}$, $Mn^{II}$ or $Ni^{II}$ or combined with at least one precursor compound of an element chosen from $Fe^{II}$, $Fe^{III}$, $Co^{II}$, $Mn^{II}$ or $Ni^{II}$.

During the use of a precursor of an element (M) or of an element chosen from $Fe^{II}$, $Fe^{III}$, $Co^{II}$, $Mn^{II}$ or $Ni^{II}$, the process according to the invention can also employ a compound which reduces one or other of the precursor compounds.

Thus, the process according to the invention can employ an element (M) and at least one precursor compound of an element chosen from $Fe^{II}$, $Fe^{III}$, $Co^{II}$, $Mn^{II}$ or $Ni^{II}$ combined with a compound which reduces the precursor compound. It can also employ a precursor compound of an element (M) combined with a compound which reduces the precursor compound or else a precursor compound of an element (M) combined with a compound which reduces the precursor compound and at least one element chosen from $Fe^{II}$, $Fe^{III}$, $Co^{II}$, $Mn^{II}$ or $Ni^{II}$ or alternatively a precursor compound of an element (M) and at least one precursor compound of an element chosen from $Fe^{II}$, $Fe^{III}$, $Co^{II}$, $Mn^{II}$ or $Ni^{II}$ combined with a compound which reduces the precursor compound.

In the presence of a reducing compound, the precursor compound of the element (M) or else the precursor compound of an element chosen from $Fe^{II}$, $Fe^{III}$, $Co^{II}$, $Mn^{II}$ or $Ni^{II}$ makes it possible to obtain, preferably in situ, an element chosen from $Cu^{I}$, $Cu^{II}$, $Fe^{II}$, $Fe^{III}$, $Co^{II}$, $Mn^{II}$ or $Ni^{II}$.

Preferably, the process according to the invention employs $Cu^{I}$ and $Cu^{II}$, alone or in combination. Also preferably, the process according to the invention employs $Cu^{I}$ and $Fe^{II}$, $Cu^{II}$ and $Fe^{II}$, $Cu^{I}$ and $Fe^{III}$, $Cu^{II}$ and $Fe^{III}$, $Cu^{I}$ and $Co^{II}$, $Cu^{I}$ and $Mn^{II}$, $Cu^{I}$ and $Ni^{II}$, $Cu^{II}$ and $Co^{II}$, $Cu^{II}$ and $Mn^{II}$ or $Cu^{II}$ and $Ni^{II}$. Particularly preferably, the process according to the invention employs $Cu^{I}$ and $Fe^{II}$, $Cu^{II}$ and $Fe^{II}$, $Cu^{I}$ and $Fe^{III}$ or $Cu^{II}$ and $Fe^{III}$.

The amount of metal derivative used for the process according to the invention can vary relatively greatly. Generally for the invention, the process according to the invention employs a molar amount of metal derivative which is determined as a function of the number of olefinic unsaturations of the main monomer employed. Preferably, the process according to the invention employs a molar amount of metal derivative ranging from 200 to 5,000 ppm, preferably from 250 to 4,000 ppm, with respect to the molar amount of main monomer.

Analogously, the amount of element chosen from $Fe^{II}$, $Fe^{III}$, $Co^{II}$, $Mn^{II}$ or $Ni^{II}$ can vary relatively widely. Preferably, the process according to the invention employs an amount of this additional element ranging from 100 to 3,000 molar ppm or from 150 to 2,500 molar ppm, with respect to the molar amount of main monomer.

Also preferably for the process according to the invention, the additional element can be employed in a molar ratio ranging from 0.5 molar % to 60 molar %, preferably from 2 molar % to 55 molar %, with respect to the amount of element (M).

For the process according to the invention, the amounts of precursor compound of the element (M) or of precursor compound of the additional element are determined from the respective amounts of the element (M) or of the additional element which have to be employed.

Besides a specific metal derivative, the process according to the invention also employs at least one aromatic compound (A) comprising at least one functional group (F) which is chosen from hydroxyl, primary amine, secondary amine and tertiary amine. According to the invention, the functional group (F) is directly bonded to the aromatic ring of the aromatic compound (A). The compound (A) can comprise several rings, one at least of which is an aromatic ring. The functional group (F) is then directly bonded to one of these aromatic rings.

According to the invention, the compound (A) can comprise one or more functional groups (F).

Preferably according to the invention, the aromatic compound (A) is a hydroxylated compound. More preferably, it is chosen from benzoquinone, hydroquinone, catechol, pyrocatechol, tertio-butylpyrocatechol, gallic acid, tannic acid, tannic liquor, 4-hydroxybenzoic acid, 4-aminophenol, salicylic acid, syringic acid, dopamine or dopamine-HCl, resorcinol, lignosulfonate, curcumin, para-methoxyphenol, anthocyanidols, humic acid and their mixtures.

According to the invention, the compound (A) can also be the ketone derivative of the hydroxylated aromatic compound. Such a ketone derivative can in particular be chosen from quinones.

For the process according to the invention, the amount of compound (A) is determined with respect to the number of functional groups (F) employed. Thus, the process according to the invention employs the aromatic compound (A) in an amount equivalent to at least 300 molar ppm of functional group (F) directly bonded to the aromatic ring, with respect to the molar amount of main monomer. Preferably, the amount of aromatic compound (A) employed corresponds to an amount equivalent to at least 325 molar ppm, preferably to at least 350 molar ppm, of functional group (F), with respect to the molar amount of anionic monomer.

For the process according to the invention, this amount can be greater than 500, 1,000 or 5,000 ppm, with respect to the molar amount of anionic monomer. It can reach or exceed 10,000 ppm, with respect to the molar amount of main monomer.

Generally for the invention, the process according to the invention employs a molar amount of aromatic compound (A) which is determined as a function of the number of olefinic unsaturations of the anionic monomer employed.

The polymer prepared according to the process of the invention is obtained by a polymerization reaction in water of at least one main monomer comprising at least one polymerizable olefinic unsaturation. For the anionic monomer, the polymerizable olefinic unsaturation is preferably a polymerizable ethylenic unsaturation.

Preferably, the main monomer is an anionic monomer and in particular an anionic monomer comprising at least one polymerizable olefinic unsaturation, preferably a polymerizable vinyl functional group, and at least one carboxylic acid functional group. Thus and particularly preferably, the polymer according to the invention is an anionic polymer.

More preferably, the anionic monomer is chosen from acrylic acid, methacrylic acid, an acrylic acid salt or a methacrylic acid salt. During the implementation of the process according to the invention, these preferred monomers can be combined with an acid chosen from maleic acid, itaconic acid, crotonic acid, a maleic acid salt, an itaconic acid salt, a crotonic acid salt and their mixtures.

The preferred anionic monomer according to the invention is acrylic acid, used alone or in combination with another comonomer.

The process according to the invention can also comprise the use of at least one comonomer chosen from AMPS, 2-sulfoethyl methacrylate, sodium metallylsulfonate, styrenesulfonate, their salts and a non-ionic comonomer.

According to the invention, AMPS is 2-acrylamido-2-methylpropanesulfonic acid (AMPS) or one of its salts, for example a salt chosen from alkali metal salts, such as the sodium, potassium or lithium salts, alkaline earth metal salts, such as the calcium or magnesium salts, ammonium salts or alkylated ammonium salts, such as the 2-amino-2-methyl-1-propanol (AMP), ethanolamine, diethanolamine or triethanolamine salts. The preferred AMPS salts are the sodium and ammonium salts.

The non-ionic comonomer can be chosen from the esters of an acid chosen from acrylic acid, methacrylic acid, maleic acid, itaconic acid, crotonic acid and their mixtures. Preferably, the non-ionic comonomer can be chosen from the esters of an acid chosen from acrylic acid and methacrylic acid.

Advantageously, the comonomer is employed in an amount by weight which is less than the amount of main monomer.

When at least one comonomer is employed, the process according to the invention employs an amount of metal derivative which is determined as a function of the number of olefinic unsaturations of the main monomer and of the comonomer employed.

Advantageously, the process according to the invention employs at least one initiator compound chosen from hydrogen peroxide, sodium persulfate, potassium persulfate, ammonium persulfate, alkyl hydroperoxide and their mixtures. The preferred initiator compound is hydrogen peroxide.

Advantageously for the process according to the invention, the polymer obtained can be neutralized. The process according to the invention can thus also comprise the complete or partial neutralization of the polymer prepared. Preferably, the neutralization of the polymer is carried out by means of at least one compound chosen from alkali metal hydroxides, alkaline earth metal hydroxides, ammonium hydroxide, alkaline earth metal dihydroxides, amines, metal oxides, in particular calcium oxide, magnesium oxide and zinc oxide, and their mixtures. The complete or partial neutralization by means of sodium hydroxide or potassium hydroxide is preferred.

The invention also relates to the reaction medium composition employed for the process according to the invention. Thus, the invention also provides a composition comprising:
  at least one main monomer comprising at least one polymerizable olefinic unsaturation;
  at least one metal derivative which is complexed, bonded to at least one ligand or in the ionic form and comprising:
    at least one element (M) chosen from $Cu^I$ and $Cu^{II}$; or
    at least one precursor compound of an element (M);
  at least one aromatic compound (A) comprising at least one functional group (F) chosen from hydroxyl, primary amine, secondary amine and tertiary amine directly bonded to the aromatic ring, in an amount equivalent to at least 300 molar ppm of functional group (F) with respect to the molar amount of main monomer; and
  at least one initiator compound chosen from hydrogen peroxide, sodium persulfate, potassium persulfate, ammonium persulfate, alkyl hydroperoxide and their mixtures.

The composition according to the invention can comprise at least one anionic main monomer and also water.

The use of the composition according to the invention in the preparation of a water-soluble polymer, preferably of a water-soluble anionic polymer, also comes within the invention.

Besides a preparation process, the invention also relates to the polymer prepared during the implementation of this process. Thus, the invention relates to a polymer of at least one main monomer comprising at least one polymerizable olefinic unsaturation, the molecular mass $M_W$ of which is less than 10,000 g/mol and the polydispersity index $I_p$ of which is less than 3.5. According to the invention, the polymer can be in the acid form or in the neutralized form. The polymer according to the invention in the acid form can be neutralized by means of at least one compound chosen from alkali metal hydroxides, alkaline earth metal hydroxides, ammonium hydroxide, alkaline earth metal dihydroxides, amines, metal oxides, in particular calcium oxide, magnesium oxide and zinc oxide, and their mixtures. The complete or partial neutralization by means of sodium hydroxide or potassium hydroxide is preferred.

Particularly advantageously, the polymer according to the invention does not comprise a residual volatile organic compound.

Also particularly advantageously, the polymer according to the invention comprises an amount of salt chosen from sulfates, sulfites, phosphates, phosphites or hypophosphites which is less than 2,000 ppm, with respect to the amount of main monomer. Preferably, this amount is less than 1,500 ppm, indeed even less than 1,000 ppm, with respect to the amount of main monomer.

The specific, advantageous or preferred characteristics defined for the process according to the invention define polymers, compositions or uses according to the invention which are specific, advantageous or preferred.

According to the invention, the molecular weight of the polymers is determined by size exclusion chromatography (SEC) or gel permeation chromatography (GPC). This technique employees a Waters brand liquid chromatography device provided with a detector. This detector is a Waters brand refractometric concentration detector. This liquid chromatography equipment has a size exclusion column in order to separate the different molecular weights of the copolymers studied. The liquid elution phase is an aqueous phase adjusted to pH 9.00 using 1N sodium hydroxide containing 0.05M of $NaHCO_3$, 0.1M of $NaNO_3$, 0.02M of triethanolamine and 0.03% of $NaN_3$.

According to a first step, 0.9% of the copolymer solution on a dry basis is diluted in the dissolution solvent of the SEC, which corresponds to the liquid elution phase of the SEC, to which is added 0.04% of dimethylformamide, which acts as marker of flow rate or internal standard. Filtration through a 0.2 μm filter is then carried out. 100 μl are subsequently injected into the chromatography device (eluent: an aqueous phase adjusted to pH 9.00 with 1N sodium hydroxide solution containing 0.05M of $NaHCO_3$, 0.1M of $NaNO_3$, 0.02M of triethanolamine and 0.03% of $NaN_3$).

The liquid chromatography device contains an isocratic pump (Waters 515), the flow rate of which is adjusted to 0.8 ml/min. The chromatography device also comprises an oven which itself comprises, in series, the following system of columns: a precolumn of Waters Ultrahydrogel Guard Column type with a length of 6 cm and an internal diameter of 40 mm, and a linear column of Waters Ultrahydrogel type with a length of 30 cm and an internal diameter of 7.8 mm. The detection system is composed of a Waters 410 refractometric detector of RI type. The oven is brought to a temperature of 60° C. and the refractometer is brought to a temperature of 45° C.

The chromatography device is calibrated by means of powdered sodium polyacrylate standards of different molecular weights certified by the supplier: Polymer Standards Service or American Polymer Standards Corporation.

The examples which follow make it possible to illustrate the different aspects of the invention.

A mixture (1) defined according to Tables 1, 2 and 3 is charged to a 1,000 ml reactor equipped with a mechanical stirrer, with heating by an oil bath and with a system for measuring the temperature which makes possible thermal regulation. The aromatic compound (A) is introduced into the reactor (1). The reactor is then heated to a temperature of 93±2° C.

When this temperature is reached, peristaltic pumps equipping the reactor make it possible to simultaneously inject the mixture (2) and the mixture (3) which are prepared beforehand and defined according to Tables 1, 2 and 3. A temperature of 93±2° C. is maintained.

The duration of injection of the mixture (1) is 120 min and the duration of injection of the mixture (3) is 150 min. Once the injections are complete, the reactor is allowed to cool.

Weight-average molecular mass $M_W$ and polydispersity index $I_p$ are measured and calculated after complete neutralization with sodium hydroxide solution of the samples of polymer prepared.

The characteristics of the polymers according to the invention and of comparative polymers are presented in Tables 1, 2 and 3 (amounts expressed in g).

TABLE 1

| | | Polymer | | | | | | | | |
|---|---|---|---|---|---|---|---|---|---|---|
| | | Comparative | | | | According to the invention | | | | |
| Example | | 1 | 2 | 3 | 4 | 5 | 6 | 7 | 8 | 9 |
| Element (M) | | $Fe^{II}$ | $Fe^{III}/Fe^{II}$ | $Mn^{II}$ | $Co^{II}/Fe^{II}$ | $Cu^{II}$ | $Cu^{II}$ | $Cu^{II}$ | $Cu^{II}$ | $Cu^{II}$ |
| Aromatic compound (A) | | gallic acid | hydroquinone | gallic acid | gallic acid | pyrocathecol | gallic acid | gallic acid | gallic acid | gallic acid |
| Reactor (1) | raw water | 245 | 245 | 245 | 245 | 245 | 245 | 245 | 245 | 245 |
| | $Cu(OH)_2 \cdot CuCO_3$ | 0 | 0 | 0 | 0 | 0 | 0.771 | 0 | 0 | 0 |
| | Cu acetate | 0 | 0 | 0 | 0 | 0.37 | 0 | 0 | 0 | 0 |
| | $CuSO_4 \cdot 5H_2O$ | 0 | 0 | 0 | 0 | 0 | 0 | 2.258 | 0.74 | 3.84 |
| | $CoSO_4 \cdot 7H_2O$ | 0 | 0 | 0 | 0.727 | 0 | 0 | 0 | 0 | 0 |
| | $FeSO_4 \cdot 7H_2O$ | 1.0300 | 0.3105 | 0 | 0.3105 | 0 | 0 | 0 | 0 | 0 |
| | $FeCl_3$ | 0 | 0.419 | 0 | 0 | 0 | 0 | 0 | 0 | 0 |
| | Mn acetate $\cdot 4H_2O$ | 0 | 0 | 1.71 | 0 | 0 | 0 | 0 | 0 | 0 |
| | acrylic acid | 5 | 5 | 5 | 5 | 5 | 5 | 5 | 5 | 5 |
| Main monomer (2) | acrylic acid | 274.822 | 274.822 | 274.822 | 274.822 | 274.822 | 274.822 | 274.822 | 274.822 | 274.822 |
| Initiator (3) | raw water | 9.4 | 9.4 | 9.4 | 9.4 | 9.4 | 9.4 | 9.4 | 9.4 | 9.4 |
| | 35% $H_2O_2$ | 35.3 | 35.3 | 35.3 | 35.3 | 35.3 | 35.3 | 35.3 | 35.3 | 35.3 |
| $M_w$ (g/mol) | | 30,000 | 36,310 | 173,940 | 30,275 | 9,755 | 5,695 | 4,400 | 8,465 | 5,125 |
| $I_p$ | | 4.8 | 5.2 | 15.3 | 5.1 | 3.0 | 2.6 | 2.3 | 3.0 | 2.5 |
| Functional group (F)/ amount of main monomer molar ratio (ppm) | | 643 | 654 | 1,024 | 751 | 654 | 1,024 | 1,024 | 1,024 | 1,024 |

TABLE 2

| | | Polymer according to the invention | | | | | | |
|---|---|---|---|---|---|---|---|---|
| Example | | 10 | 11 | 12 | 13 | 14 | 15 | 16 |
| Element (M) | | Fe(II)/Cu(II) | Fe(II)/Cu(II) | Cu(I)/Fe(II) | Cu(II)/Fe(III) | Fe(II)/Cu(II) | Fe(II)/Cu(II) | Fe(II)/Cu(II) |
| Aromatic compound (A) | | hydroquinone | pyrocathecol | gallic acid | 1,4-benzoquinone | curcumin | tannic acid | resorcinol |
| Reactor (1) | raw water | 245 | 245 | 245 | 245 | 245 | 245 | 245 |
| | $Cu(OH)_2 \cdot CuCO_3$ | 0.286 | 0.572 | 0 | 0 | 0.286 | 0.286 | 0.286 |
| | $CuSO_4 \cdot 5H_2O$ | 0 | 0 | 0 | 0.646 | 0 | 0 | 0 |
| | CuBr | 0 | 0 | 0.371 | 0 | 0 | 0 | 0 |

TABLE 2-continued

| | | Polymer according to the invention | | | | | | |
|---|---|---|---|---|---|---|---|---|
| Example | | 10 | 11 | 12 | 13 | 14 | 15 | 16 |
| | $FeSO_4 \cdot 7H_2O$ | 0.3105 | 0.621 | 0.3105 | 0 | 0.3105 | 0.3105 | 0.3105 |
| | $FeCl_3$ | 0 | 0 | 0 | 0.181 | 0 | 0 | 0 |
| | acrylic acid | 5 | 5 | 5 | 5 | 5 | 5 | 5 |
| Main monomer (2) | acrylic acid | 274.822 | 274.822 | 274.822 | 274.822 | 274.822 | 274.822 | 274.822 |
| Initiator (3) | raw water | 9.4 | 9.4 | 9.4 | 9.4 | 9.4 | 9.4 | 9.4 |
| | 35% $H_2O_2$ | 35.3 | 70.6 | 35.3 | 35.3 | 35.3 | 35.3 | 35.3 |
| $M_w$ (g/mol) | | 5,400 | 3,135 | 7,120 | 5,235 | 6,480 | 6,005 | 5,800 |
| $I_p$ | | 2.5 | 2.1 | 2.8 | 2.4 | 2.7 | 2.6 | 2.5 |
| Functional group (F)/main monomer molar ratio (ppm) | | 654 | 654 | 751 | 1,033 | 312 | 645 | 770 |

TABLE 3

| | | Polymer according to the invention | | | | | |
|---|---|---|---|---|---|---|---|
| Example | | 17 | 18 | 19 | 20 | 21 | 22 |
| Element (M) | | Fe(II)/Cu(II) | Fe(II)/Cu(II) | Fe(II)/Cu(II) | Fe(II)/Cu(II) | Fe(II)/Cu(II) | Fe(II)/Cu(II) |
| Aromatic compound (A) | | 4-aminophenol | syringic aid | dopamine (.HCl) | salicylic acid | 4-hydroxybenzoic acid | hydroquinone |
| Reactor (1) | raw water | 245 | 245 | 245 | 245 | 245 | 245 |
| | $Cu(OH)_2 \cdot CuCO_3$ | 0.286 | 0.286 | 0.286 | 0.286 | 0.286 | 0.286 |
| | $CuSO_4 \cdot 5H_2O$ | 0 | 0 | 0 | 0 | 0 | 0 |
| | CuBr | 0 | 0 | 0 | 0 | 0 | 0 |
| | $FeSO_4 \cdot 7H_2O$ | 0.3105 | 0.3105 | 0.3105 | 0.3105 | 0.3105 | 0.3105 |
| | $FeCl_3$ | 0 | 0 | 0 | 0 | 0 | 0 |
| | acrylic acid | 5 | 5 | 5 | 5 | 5 | 5 |
| Main monomer (2) | acrylic acid | 274.822 | 274.822 | 274.822 | 274.822 | 274.822 | 274.822 |
| Initiator (3) | raw water | 9.4 | 9.4 | 9.4 | 9.4 | 9.4 | 9.4 |
| | 35% $H_2O_2$ | 35.3 | 35.3 | 35.3 | 35.3 | 35.3 | 35.3 |
| $M_w$ (g/mol) | | 5,380 | 5,900 | 5,635 | 6,050 | 6,000 | 5,700 |
| $I_p$ | | 2.5 | 2.6 | 2.5 | 2.6 | 2.6 | 2.5 |
| Functional group (F)/amount of main monomer molar ratio (ppm) | | 776 | 298 | 496 | 377 | 377 | 1,570 |

The invention claimed is:

1. A process for the preparation of a water-soluble polymer, the weight-average molecular mass $M_w$ (determined by SEC) of which ranges from 1,000 to 10,000 g/mol and the polydispersity index $I_p$, of which is less than 3.5, the process comprising performing a polymerization reaction in water, at a temperature of greater than 60° C., of at least one main monomer comprising at least one polymerizable olefinic unsaturation, in the presence:

of at least one metal derivative which is complexed, bonded to at least one ligand or in the ionic form and comprising:
at least one element (M) chosen from $Cu^I$ and $Cu^{II}$; or
at least one precursor compound of an element (M);
of at least one aromatic compound (A) comprising at least one functional group (F) selected from the group consisting of hydroxyl, primary amine, secondary amine and tertiary amine directly bonded to the aromatic ring, in an amount equivalent to at least 300 molar ppm of functional group (F) with respect to the molar amount of main monomer; and
at least one initiator compound selected from the group consisting of hydrogen peroxide, sodium persulfate, potassium persulfate, ammonium persulfate, alkyl hydroperoxide and their mixtures.

2. The process according to claim 1, wherein:
the at least one metal derivative is chosen from copper carbonate, copper carbonate hydrate, copper carbonate hemihydrate, copper acetate, copper sulfate, iron sulfate, iron sulfate hydrate, iron sulfate hemihydrate, iron carbonate, iron carbonate hydrate, iron carbonate hemihydrate or copper hydroxide; or
the aromatic compound (A) is in an amount equivalent to at least 325 molar ppm of functional group (F), with respect to the molar amount of main monomer.

3. The process according to claim 1, for which:
a weight-average molecular mass $M_w$ of the polymer is less than 9,000 g/mol; or
the weight-average molecular mass $M_w$ of the polymer is greater than 1,200 g/mol; or
a polydispersity index $I_p$ of the polymer is less than 3.

4. The process according to claim 3, wherein:
the at least one metal derivative is chosen from copper carbonate, copper carbonate hydrate, copper carbonate hemihydrate, copper acetate, copper sulfate, iron sulfate, iron sulfate hydrate, iron sulfate hemihydrate, iron carbonate, iron carbonate hydrate, iron carbonate hemihydrate or copper hydroxide; or
the aromatic compound (A) is in an amount equivalent to at least 325 molar ppm of functional group (F), with respect to the molar amount of main monomer.

5. The process according to claim 1, comprising employing:
an element (M) and at least one element chosen from $Fe^{II}$, $Fe^{III}$, $Co^{II}$, $Mn^{II}$ or $Ni^{II}$; or an element (M) and at least one precursor compound of an element chosen from $Fe^{II}$, $Fe^{III}$, $Co^{II}$, $Mn^{II}$ or $Ni^{II}$; or a precursor compound of an element (M); or a precursor compound of an element (M) and at least one element chosen from $Fe^{II}$, $Fe^{III}$, $Co^{II}$, $Mn^{II}$ or $Ni^{II}$; or a precursor compound of an element (M) and at least one precursor compound of an element chosen from $Fe^{II}$, $Fe^{III}$, $Co^{II}$, $Mn^{II}$, or $Ni^{II}$; or an element (M) and at least one precursor compound of an element chosen from $Fe^{II}$, $Fe^{III}$, $Co^{II}$, $Mn^{II}$ or $Ni^{II}$ combined with a compound which reduces the precursor compound; or a precursor compound of an element (M) combined with a compound which reduces the precursor compound; or a precursor compound of an element (M) combined with a compound which reduces the precursor compound and at least one element chosen from $Fe^{II}$, $Fe^{III}$, $Co^{II}$, $Mn^{II}$ or $Ni^{II}$; or a precursor compound of an element (M) and at least one precursor compound of an element chosen from $Fe^{II}$, $Fe^{III}$, $Co^{II}$, $Mn^{II}$ or $Ni^{II}$ combined with a compound which reduces the precursor compound.

6. The process according to claim 1, wherein the aromatic compound (A) is hydroxylated and is selected from the group consisting of benzoquinone, hydroquinone, catechol, pyrocatechol, tert-butylpyrocatechol, gallic acid, tannic acid, tannic liquor, 4-hydroxybenzoic acid, 4-aminophenol, salicylic acid, syringic acid, dopamine or dopamine-HCl, resorcinol, lignosulfonate, curcumin, para-methoxyphenol, anthocyanidins, humic acid and their mixtures.

7. The process according to claim 1, wherein the main monomer is an anionic monomer.

8. The process according to claim 1, further comprising the use of at least one comonomer.

9. The process according to claim 1, wherein the process is carried out in water.

10. The process according to claim 9, wherein the process is carried out in deionized water.

11. The process according to claim 1, wherein the process is carried out in the absence of chain-transfer agent.

12. The process according to claim 1, wherein the process is carried out in an aqueous medium or in the absence of organic solvent or carried out in an aqueous medium and in the absence of organic solvent.

13. The process according to claim 1, wherein the reaction medium comprises a mass amount of less than 6,000 ppm, with respect to the mass amount of main monomer, of salt chosen from sulfates, sulfites, phosphates, phosphites or hypophosphites.

14. The process according to further comprising performing complete or partial neutralization of the polymer.

15. A polymer of at least one main monomer comprising at least one polymerizable olefinic unsaturation, the molecular mass $M_w$ (determined by SEC) of which is less than 10,000 g/mol and the polydispersity index $I_p$ of which is less than 3.5, obtained according to the process of claim 1 and not comprising a residual volatile organic compound or comprising an amount of salt chosen from sulfates, sulfites, phosphates, phosphites or hypophosphites which is less than 2,000 ppm, with respect to the amount of main monomer.

* * * * *